United States Patent [19]

Schneider

[11] Patent Number: 4,845,835

[45] Date of Patent: Jul. 11, 1989

[54] TOOL-CHANGE AND WORKPIECE-CHANGE APPARATUS

[75] Inventor: Rudolf Schneider, Reinach, Switzerland

[73] Assignee: Erowa AG, Reinach, Switzerland

[21] Appl. No.: 206,529

[22] Filed: Jun. 14, 1988

[30] Foreign Application Priority Data

Jun. 16, 1987 [DE] Fed. Rep. of Germany ....... 3720180

[51] Int. Cl.$^4$ ............................................. B23Q 3/156
[52] U.S. Cl. ............................................. 29/568; 414/1
[58] Field of Search .................... 29/568, 26 A, 26 R; 211/1.5; 414/1, 4, 735; 901/18, 26

[56] References Cited

U.S. PATENT DOCUMENTS

| | | | |
|---|---|---|---|
| 4,030,617 | 6/1977 | Richter | 901/18 X |
| 4,068,536 | 1/1978 | Stackhouse | 901/26 X |
| 4,365,928 | 12/1982 | Baily | 414/735 |
| 4,558,506 | 12/1985 | Kielma | 29/568 |
| 4,637,120 | 1/1987 | Geiger | 29/568 |
| 4,713,875 | 12/1987 | Dormehl | 29/568 |
| 4,736,512 | 4/1988 | Gusching | 29/568 X |

FOREIGN PATENT DOCUMENTS

| | | | |
|---|---|---|---|
| 2032874 | 1/1972 | Fed. Rep. of Germany | 414/1 |
| 2110943 | 9/1972 | Fed. Rep. of Germany | 29/568 |
| 3409682 | 9/1985 | Fed. Rep. of Germany | 29/568 |
| 237807 | 7/1986 | Fed. Rep. of Germany | 29/568 |
| 2564352 | 11/1985 | France | 29/568 |
| 1196207 | 12/1985 | U.S.S.R. | 29/568 |
| 1234936 | 6/1971 | United Kingdom | 29/568 |

Primary Examiner—William Briggs
Attorney, Agent, or Firm—Tarolli, Sundheim & Covell

[57] ABSTRACT

The invention refers to a tool or workpiece storing magazine incorporating a tool- or workpiece-change apparatus adapted to remove a tool or a workpiece from the magazine and to transport the it into a machining apparatus, and to remove a tool or workpiece from the machining apparatus and to transport it back to the storing magazine, respectively. The system comprises a plurality of essentially disc-shaped tool or workpiece supporting members rotatably and coaxially arranged with reference to a first axis of rotation which receive and support a plurality of tools or workpieces along the periphery thereof. A transport arm is pivotally mounted on a second axis of rotation and longitudinally displaceable along said second axis located in a certain distance from said first axis of rotation. The transport arm is adjustable with reference to its length and includes a gripping member mounted on its free end. The transport arm further includes a turning knuckle, the axis thereof extending in an angle of 45° with reference to the length adjustment direction of the transport arm, and a transport arm element, one end thereof being connected to said turning knuckle and the other end thereof bearing said gripping means, whereby the transport arm element means is generally L- or arc-shaped.

16 Claims, 3 Drawing Sheets

TOOL-CHANGE AND WORKPIECE-CHANGE APPARATUS

BACKGROUND OF THE INVENTION

1. Field of the Invention

The present invention refers to a tool storing magazine incorporating a tool-change apparatus adapted to remove a tool from the magazine and to transport the tool into a workpiece machining apparatus, and adapted to remove a tool from the workpiece machining apparatus and to transport the tool back to the tool storing magazine, respectively. Further, the invention refers to a workpeice storing magazine incorporating a workpeice-change apparatus adapted to remove a workpiece from the magazine and to transport the workpeice into a machining apparatus, and adapted to remove a workpeice from the machining apparatus and to transport the workpeice back to the workpiece storing magazine. Still further, the invention refers to the use of the tool storing magazine incorporating a tool-change apparatus of the kind referred to hereinabove for inserting and removing electrodes of an electro-erosive machining apparatus, the central axis of the inserted electrodes running in vertical or horizontal direction. Finally, the invention refers to the use of the workpiece storing magazine incorporating a workpiece-change aparatus of the kind referred to hereinabove for feeding workpieces to and removing workpieces from, respectively, an electro-erosive machining apparatus, the central axis of the workpieces received in the apparatus running in vertical or horizontal direction.

Many machining operation of a single workpiece require that the the tool used to machine the workpiece has to be changed several times in the course of the machining operation, particularly if the control of the machining apparatus is performed more or less automatically; such a machining apparatus is in a position to preform a plurality of machining operations on a single workpiece in sequence. In order not to disturb or interrupt this automatically running machining operation, automatically operating tool-change means have been developed which can be controlled by the same control means which are used for controlling the automatic operation of the machining apparatus.

These problems are particularly present in connection with the electro-erosive machining of workpieces because such machining is a relatively slowly progressing machining operation. Thus, it is most desirable to automate this kind of machining operation as fully as possible.

2. Prior Art

In the prior art are known, for instance, electro-erosive machining apparatus incorporating an electrode-change device which includes an electrode magazine in the form of an endless, continuously running chain-like storage member. Further, a gripping arm is provided and operated to grasp a slected electrode and to insert it into the electro-erosive machining apparatus, and to remove the electrode from the electro-erosive machining apparatus and to put it back into the storage member, respectively. In order to ensure that the selected electrode is taken out of the magazine and that the electrode removed from the machining apparatus is put back to its proper position in the magzine, respectively, a magazine of the kind referred to above must be driven to run along a continuous path until the selected electrode and the proper storage position, respectively, comes to a location where it can be reached by means of the above mentioned gripping arm.

The main disadvantage of this kind of electrode-change apparatus are, on the one hand, the large space requirement and, on the other hand, the comparatively slow access speed, particularly if a large number of electrodes are in the magazine which must be ready for immediate access.

In order to avoid these disadvantages, it has been proposed to use a tool magazine comprising a plurality of essentially disc-shaped tool support members which are rotatable around a first axis of rotation, the tools being arranged along the periphery of the tool support members. Further, there is provided a transport arm which is pivotal around a second axis of rotation and located in a certain distance from the first axis of rotation, said transport arm being adapted to grasp the tools, to remove them from the magazine and to insert them into the machining apparatus and vice versa. Such a tool magazine requires less space and has an improved access speed.

However, there is the disadvantage that such a tool magazine is not universally usable. On the one hand, modern machining centres including electro-erosive machining apparatus often make use of more than one reference axis; for instance, an electrode or a workpiece has to be mounted with its axis running either in vertical or in horizontal direction. On the other hand, the need may arise to machine a plurality of workpieces sequentially with a single tool, e.g. with the same electrode, which consequently has not to be changed.

OBJECTS OF THE INVENTION

It is an object of the invention to provide a system which is universally usable in connection with nearly all types and kinds of machining apparatus not only to insert and remove, respectively, tools which may be oriented according to different reference axes, but also to change workpieces to be machined with a single tool.

It is a further object of the invention to provide a tool storing magazine incorporating a tool-change apparatus adapted to remove a tool from the magazine and to transport the tool into a workpiece machining apparatus, and adapted to remove a tool from the workpiece machining apparatus and to transport the tool back to the tool storing magazine, respectively, which requires less space than known systems and which has faster access to the tools contained in the magazine.

It is a still further object of the invention to provide a workpiece storing magazine incorporating a workpiece-change apparatus adapted to remove a workpiece from the magazine and to transport the workpiece into a machining apparatus, and adapted to remove a workpiece from the machining apparatus and to transport the workpiece back to the workpiece storing magazine, respectively, which requires less space than known systems and which has faster access to the workpieces contained in the magazine.

SUMMARY OF THE INVENTION

In a first aspect, the invention provides a tool storing magazine incorporating a tool-change apparatus adapted to remove a tool from the magazine and to transport the tool into a workpiece machining apparatus, and adapted to remove a tool from the workpiece machining apparatus and to transport the tool back to the tool storing magazine, respectively. It comprises a plurality of essentially disc-shaped tool supporting members rotatably and coaxially arranged with reference to a first axis of rotation. These tool supporting members recieve and support a plurality of tools along the periphery thereof.

Further, the tool-change apparatus comprises a transport arm which is pivotally mounted on a second axis of rotation and longitudinally displaceable along said second axis. This second axis of rotation is located in a certain distance from said first axis of rotation. The transport arm is adjustable with reference to its length and includes a gripping means mounted on its free end.

The transport arm further includes a turning knuckle, the axis thereof extending in an angle of 45° with reference to the length adjustment direction of the transport arm, and a transport arm element. One end of the transport arm element is connected to the turning knuckle and the other end thereof bears the gripping means. The general shape of the transport arm element is different from a straight line, e.g. L-shaped or curved.

In a second aspect, the invention provides a workpiece storing magazine incorporating a workpiece-change apparatus adapted to remove a workpiece from the magazine and to transport the workpiece into a machining apparatus, and adapted to remove a workpiece from the machining apparatus and to transport the workpiece back to the workpiece storing magazine, respectively. It comprises a plurality of essentially disc-shaped workpiece supporting members rotatably and coaxially arranged with reference to a first axis of rotation. These workpiece supporting members recieve and support a plurality of workpiece along the periphery thereof.

Further, the workpiece-change apparatus comprises a transport arm which is pivotally mounted on a second axis of rotation and longitudinally displaceable along said second axis. This second axis of rotation is located in a certain distance from said first axis of rotation. The transport arm is adjustable with reference to its length and includes a gripping means mounted on its free end.

The transport arm further includes a turning knuckle, the axis thereof extending in an angle of 45° with reference to the length adjustment direction of the transport arm, and a transport arm element. One end of the transport arm element is connected to the turning knuckle and the other end thereof bears the gripping means. The general shape of the transport arm element is different from a straight line, e.g. L-shaped or curved.

Due to the design of the transport arm as described above, an unexpected and surprising degree of freedom with regard to the movement of the gripping means results which has not been known with similar systems of the prior art. Thus, the tool or workpiece change system of the invention can be universally used in cooperation with nearly all machining equipment. The gripping means has access even to narrow and hidden places and it is only a matter of design of the control means software to adapt the system of the invention to various machining equipment.

Particularly interesting is an embodiment of the tool or workpiece change apparatus according to the invention in which the gripping means of the transport arm has a center point, and wherein the length of the two legs or the curved design of the transport arm element is such that a straight line coinciding with the axis of rotation of the turning knuckle runs through said center point of the gripping means and the central axis of a tool or workpiece received by the gripping means runs through said center point of the gripping means. Thereby, if the turning knuckle is rotated by 180°, a tool or a workpiece its rotated by 90° without real displacement. This characteristic greatly simplifies the design of the control means.

BRIEF DESCRIPTION OF THE DRAWINGS

In the following, an embodiment of the invention is further described, with reference to the accompanying drawings, in which.

DESCRIPTION OF A PREFERRED EMBODIMENT

In the following description, for the sake of simplicity and as a representative example, a tool storing magazine incorporating a tool-change apparatus in cooperation with an electro-erosive machining apparatus is described. However, it is understood that the use of system according to the invention is in no way limited to storing and changing electrodes of an electro-erosive machining apparatus. Essentially the same or a corresponding system for storing and changing tools can be used in cooperation with a wide variety of other machining apparatus which require an automatically operated exchange of tools. Similarly, the same or a corresponding system may be used for storing and changing workpieces in cooperation either with an electro-erosive machining apparatus or any other kind of machining apparatus.

Figure 1:
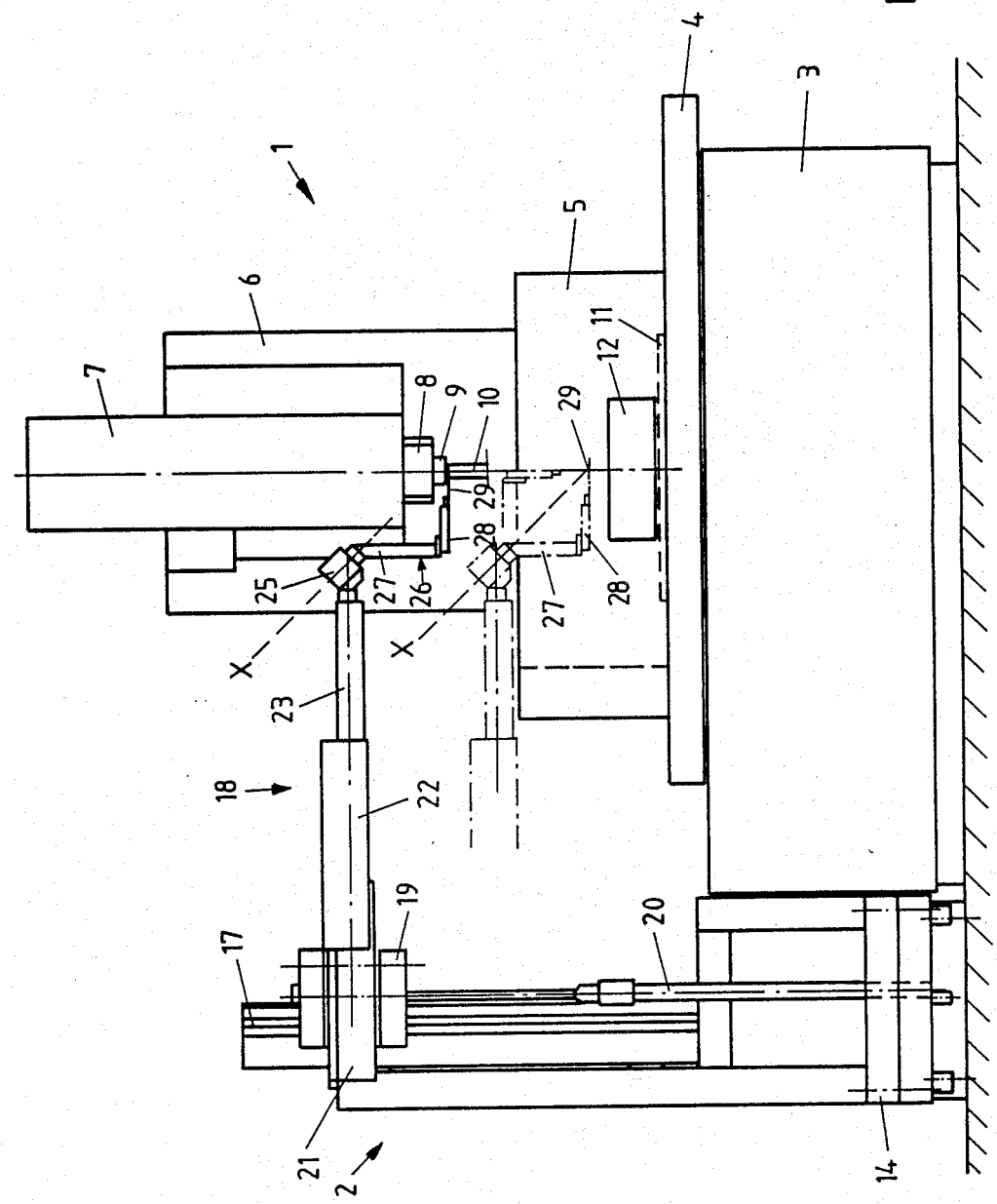
FIG. 1: shows a schematic front view of an electorerosive machining apparatus and a magazine/tool-change unit.
Figure 2:
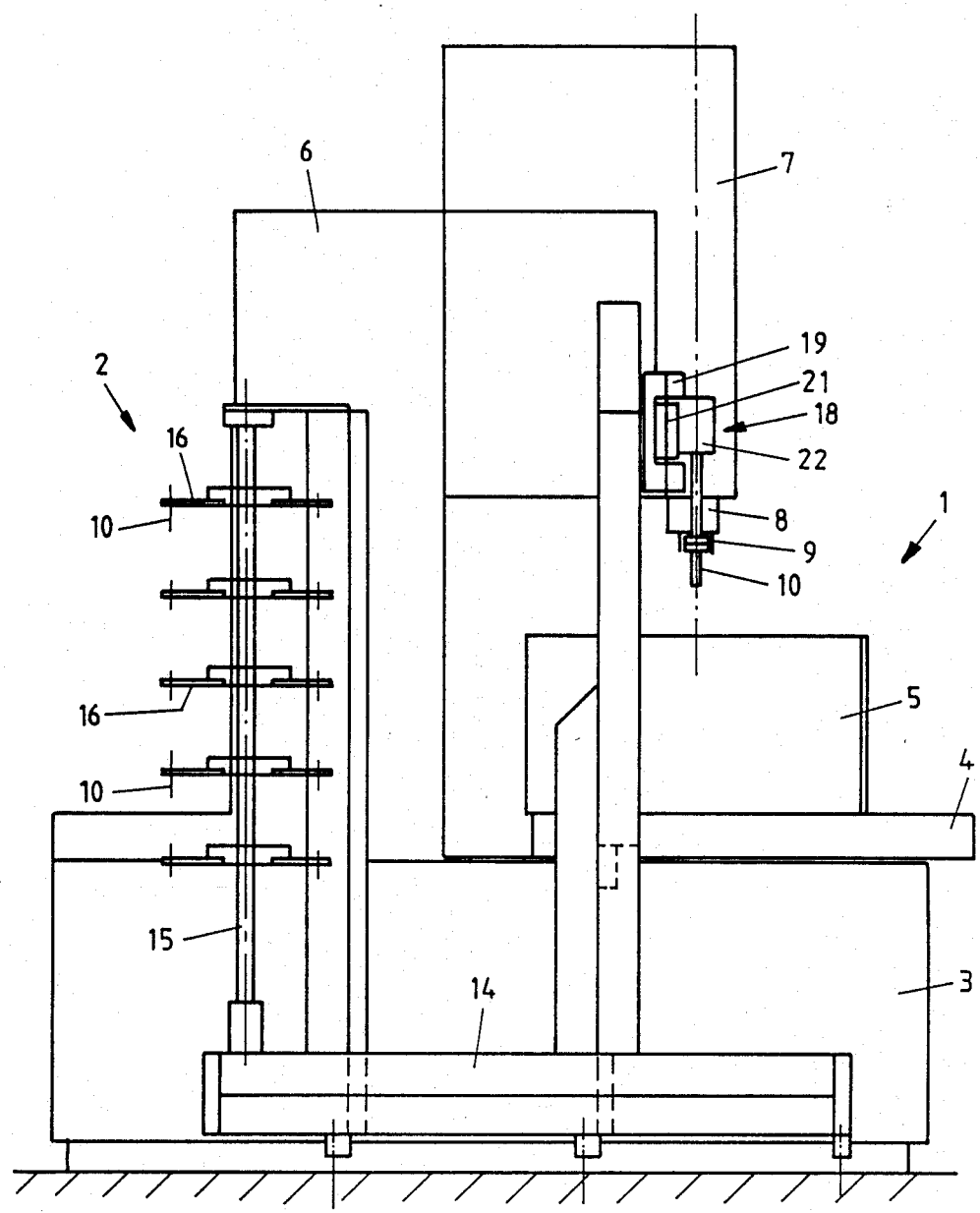
FIG. 2: shows a schematic side view of the electroerosive machining apparatus and the magazine/tool-change unit of FIG. 1.

In FIG. 1, an elector-erosive machining apparatus is generally designated with reference numeral 1, and a magazine-tool changer-unit is generally designated with reference numeral 2. The eletro-erosive machining apparatus 1 comprises a base member 3 supporting a worktable 4 displaceable in X- and Y-direction. The worktable 4 supports a tub 5 which is open on its top side and serves to receive the dielectricum fluid required for the electro-erosive machining process.

Further mounted on the base member 3 is a column 6 which supports the machining head 7. A sleeve 8 is provided in the machining head 7 such that it can be displaced in Z-direction, i.e. with regard to its height position. If necessary, the sleeve 8 can be rotated. The sleeve 8 is equipped with a chuck 9 adapted to receive a machining tool 10 which is but schematically shown in the drawings. In the present example, the tool 10 may be an electrode required for the electro-erosive machining operation. In the interior of the tub 5, there is provided a workpiece clamping means 11 adapted to receive a workpiece 12 to be machined.

The exact design and the operation of such an electro-erosive machining apparatus is well known to any person skilled in the art and must not be explained here in detail.

The magazine-tool changer-unit 2 comprises a base frame 14 serving as a base for a magazine and for a transport arm. The magazine includes an upright column 15 which is rotatable and comprises a plurality of disc-shaped tool support members 16 arranged distantly to each other. The only schematically shown tools 10 are arranged along the periphery of the disc-shaped tool support members 16; for instance, the tools may be received in radially extending slots provided along the periphery of the tool support members 16.

The base frame 14 further comprises a support column 17 which is mounted in a certain distance from the magazine column 15 and which is provided with a transport arm generally designated with reference numeral 18. The support column 17 has a sliding carriage 19 displaceable along the column 17, e.g. by means of a pneumatic cylinder 20. The real transport arm 18 includes three arm elements: A fixed arm element 21 connected to the sliding carriage 19, a first telescopically displaceable arm element 22 and a second telescopically displaceable arm element 23. The relative displacement of the arm elements 22 and 23 with reference to the fixed arm element 21 may be performed by means of a pneumatic cylinder mounted in the interior of the arm element 22; in FIG. 3, only the piston rod 24 of the said pneumatic cylinder is visible.

A turning knuckle 25 is mounted on the free end of the second telescopically displaceable arm element 23, and a transport arm element 26 is fixed to the turning knuckle 25. In the example shown in the drawings, the transport arm element 26 comprises two legs 27 and 28 which encloses a right angle. The leg 28, which is not fixed to the turning knuckle 25, is provided on its free end with gripping member 29 adapted to grasp a tool or a workpiece.

The turning knuckle 25 has an axis of rotation X running in an angle of 45° with reference to the extension of the arm elements 22 and 23. Thus, the leg 27 and thereby the entire transport arm element 26 including the gripping member 29 may be rotated around said axis X. As shown in FIG. 1 in broken lines (the sliding carriage 19 being somewhat lowered), the leg 27 extends vertically and the leg 28 extends horizontally in a first angular position of the turning knuckle 25. If the turning knuckle 25 is rotated by 180°, the leg 27 extends horizontally and the leg 28 extends vertically in a second angular position of the turning knuckle 25. Preferably, the length of the legs 27 and 28 is such that a straight line coinciding with the axis X runs through a center point of the gripping member 29. Simultaneously, the central axis of a tool or a workpiece received in the gripping member 29 runs through the said center point as well. Thus, it is achieved that the said center point, as can be clearly seen from the illustration in broken lines in FIG. 1, always remains in exactly the same position, regardless whether the turning knuckle 25 is in said first or in said second angular position.

Another possibility which is not shown in the drawings is to design the transport arm element 26 in the shape of an arc. The curvature of such an arc-shaped transport arm element 26 would be such that a straight line coinciding with said axis X also runs through said center point of the gripping member 29; consequently, the desired effect would be obtained as well.

Figure 3:
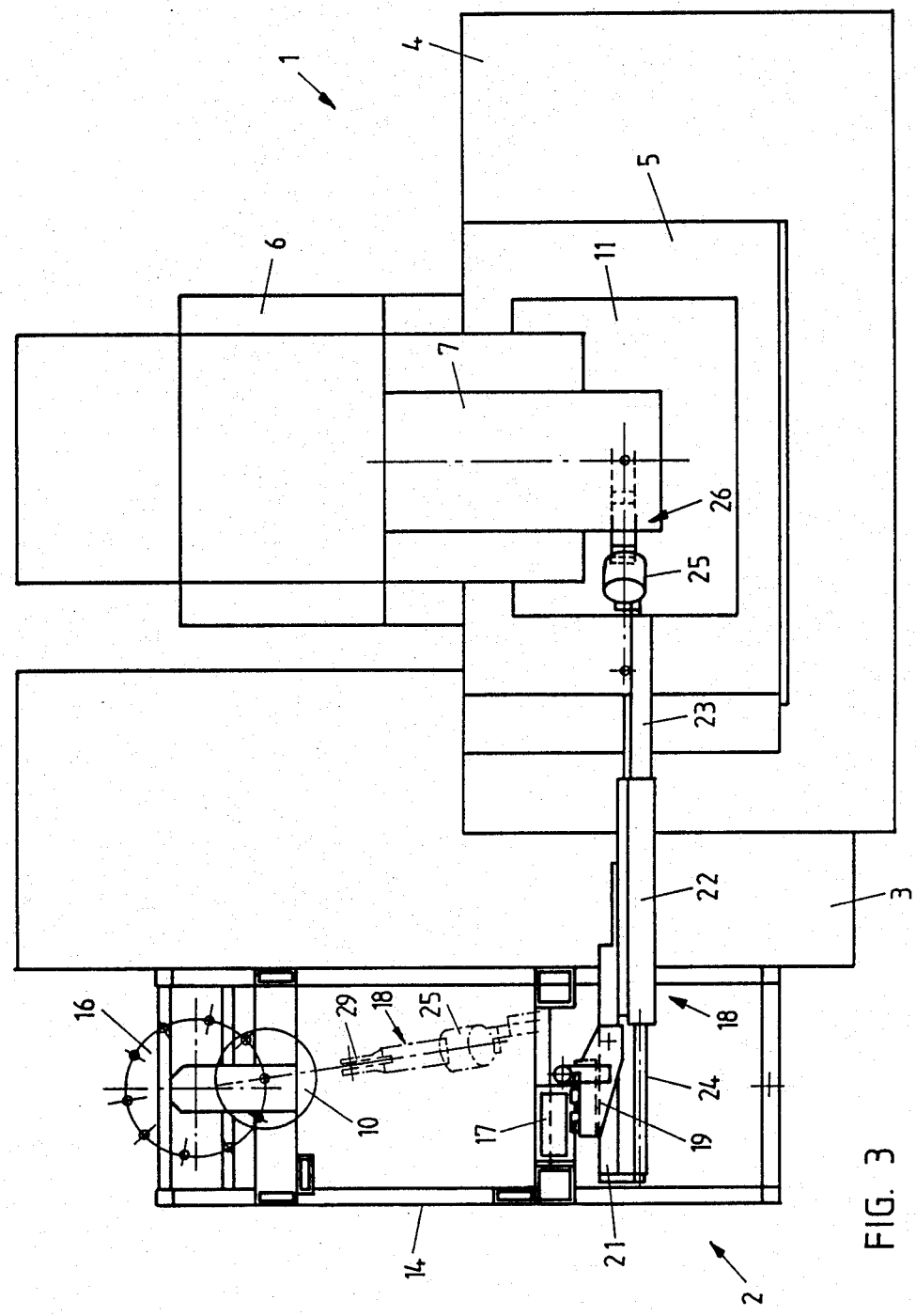
FIG. 3: shows a schematic top view of the electroerosive machining apparatus and the magazine/tool-change unit of FIG. 1.

The operation of the system is as follows: The transport arm being in its retracted position as shown by broken lines in FIG. 3 is pivoted towards the magazine and the sliding carriage 19 is displaced along the column 17 in such a height position that the gripping member 29 is in the level of the selected tool support member 16. Then, the arm 18 is extended in order to enable the gripping member 29 to grasp a tool 10. Now, the arm 18 is somewhat retracted again in order to take the tool 10 out of the magazine and, thereafter, pivoted into the position shown in FIG. 3. Finally, the arm 18 is extended again by operating the telescopically displaceable arm elements 22 and 23 such that the gripping member 29 with the tool 10 is moved toward the machining apparatus 1. Depending on the place where the tool has to be inserted, the height position of the sliding carriage 19 can be adjusted.

According to the invention, it is essential that the transport arm element 26 has a shape which is different from a straight line, particularly the shape of an angle as shown in the drawings or the shape of an arc. Thus, as can be clearly seen from FIG. 1, the transport arm element 26 can pass next to the machining head 7 in a first, raised position (shown in solid lines) in order to insert a tool 10 into the chuck 9 of the sleeve 8 by means of the gripping member 29. On the other hand, it is also possible to move the gripping member 29 into the interior of the tub 5 (shown in broken lines) in order to place a workpiece 12 onto the workpiece clamping member 11.

Depending on the workpiece, it could be necessary for the workpiece gripping member 29 to grasp the workpiece either from the top or from the side. This may be accomplished by simply rotating the turning knuckle 25 by 180° whereby it is ensured that, on the one hand, the center point of the gripping member 29 is not displaced but exactly remains in its original position and, on the other hand, the gripping member 29 can be immersed into the tub 5 again without hindering.

Thus, the system according to the invention may be used very universally and may be adapted without problems to most of the machining apparatus known in the market. Particularly, this is true when the tool magazine and the tool-change apparatus together, and the workpiece magazine and the workpiece-change apparatus together, respectively, in combination with a suitable control means associated to the magazine/apparatus combination and known per se in the art, form a simple, compact unit which can be placed, as shown in the drawings, next to the machining apparatus. A major part of the control means, including the software to control the movement of the transport arm, remains unchanged independent of the type of machining apparatus used because the movement of the transport arm with regard to the magazine is always the same. Only that part of the control software which refers to the movement of the transport arm 18 with regard to the associated machining apparatus must be individually adapted to the machining apparatus used in the pertinent case.

What I claim is:

1. A tool storing magazine incorporating a tool-change apparatus adapted to remove a tool from the magazine and to transport the tool into a workpiece machining apparatus, and adapted to remove a tool from the workpiece machining apparatus and to transport the tool back to the storing magazine, respectively, said tool-change apparatus comprising:

a plurality of essentially disc-shaped tool supporting members rotatably and coaxially arranged with reference to a first axis of rotation, said tool supporting members being adapted to receive and support a plurality of tools along the periphery thereof;

a transport arm means which is pivotally mounted on a second axis of rotation and lonitudinally displaceable along said second axis, said second axis of rotation being located a certain distance from said first axis of rotation;

said transport arm means being adjustable with reference to its length and including a gripping means mounted on its free end;

said transport arm means further including a turning knuckle, the axis thereof extending in an angle of 45° with reference to the length adjustment direction of said transport arm means, and a transport arm elements means, one end thereof deing connected to said turning knuckle and the other end thereof bearing said gripping means, whereby the general shape of said transport arm element means is different from a straight line.

2. A tool storing magazine incorporating a tool-change apparatus according to claim 1, wherein said transport arm element means is generally L-shaped.

3. A tool storing magazine incorporating a tool-change apparatus according to claim 2, wherein the two legs of said generally L-shaped transport arm element means enclose a right angle.

4. A tool storing magazine incorporating a tool-change apparatus according to claim 2, wherein said gripping means has a center point, and wherein the length of said two legs is such that a straight line coinciding with the axis of rotation of said turning knuckle runs through said center point of said gripping means and the central axis of a tool received by said gripping means runs through said center point of said gripping means.

5. A tool storing magazine incorporating tool-change apparatus according to claim 1, wherein said transport arm element means is generally arc-shaped.

6. A tool storing magazine incorporating a tool-change apparatus according to claim 5, wherein said gripping means has a center point, and wherein the size and the radius of curvature of said transport arm element means is such that a straight line coinciding with the axis of rotation of said turning knuckle runs through said center of said gripping means and the central axis of a tool received by said gripping means run through said center point of said gripping means.

7. A workpiece storing magazine incorporating a workpiece-change apparatus adapted to remove a workpiece from the magazine and to transport the workpiece into a machining apparatus, and adapted to remove a workpiece from the machining apparatus and to transport the workpiece back to the workpiece storing magazine, respectively, said workpiece-change apparatus comprising:

a plurality of essentially disc-shaped workpiece supporting members rotatably and coaxially arranged with reference to a first axis of rotation, said workpiece supporting members being adapted to receive and support a plurality of workpieces along the periphery thereof;

a transport arm means which is pivotally mounted on a second axis of rotation and longitudinally displaceable along said second axis, said second axis of rotation being located a certain distance from said first axis of rotation;

said transport arm means being adjustable with reference to its length and including a gripping means mounted on its free end;

said transport arm means further including a turning knuckle, the axis thereof extending in an angle of 45° with reference to the length adjustment direction of said transport arm means, and a transport arm element means, one end thereof being connected to said turning knuckle and the other end thereof bearing said gripping means, whereby the general shape of said transport element means is different from a straight line.

8. A workpiece storing magazine incorporating a workpiece-change apparatus according to claim 7, wherein said transport arm elements means is generally L-shaped.

9. A workpiece storing magazine incorporating a workpiece-change apparatus according to claim 8, wherein the two legs of said generally L-shaped transport arm elements means enclose a right angle.

10. A workpiece storing magazine incoporating a workpiece-change apparatus according to claim 8, wherein said gripping means has a center point, and wherein the length of said two legs is such that a straight line coinciding with the axis of rotation of said turning knuckle runs through said center point of said gripping means and the central axis of a workpiece received by said gripping means runs through said center point of said gripping means.

11. A workpiece storing magazine incorporating a workpiece-change apparatus according to claim 7, wherein said transport arm element means is generally arc-shaped.

12. A workpiece storing magazine incorporating a workpiece-change apparatus according to claim 11, wherein said gripping means has a center point, and wherein the size and the radius of curvature of said transport arm element means is such that a straight line coinciding with the axis of rotation of said turning knuckle runs through said center point of said gripping means and the central axis of a workpiece received by said gripping means runs through said center point of said gripping means.

13. A tool storing magazine incorporating a tool-change apparatus adapted to remove a tool from the magazine and to transport the tool into a workpiece machining apparatus, and adapted to remove a tool from the workpiece machining apparatus and to transport the tool back to the tool storing magazine, respectively, said tool-change apparatus comprising:

a plurality of essentially disc-shaped tool supporting members rotatably and coaxially arranged with reference to a first axis of rotation, said tool supporting members being adapted to receive and support a plurality of tools along the periphery thereof;

a transport arm means which is pivotally mounted on a second axis of rotation and longitudinally displaceable along said second axis, said second axis of rotation being located a certain distance from said first axis of rotation;

said transport arm means being adjustable with reference to its length and including a gripping means mounted on its free end;

said transport arm means further including a turning knuckle, the axis thereof extending in an angle of 45° with reference to the length adjustment direction of said transport arm means, and a transport arm element means, one end thereof being connected to said turning knuckle and the other end thereof bearing said gripping means, whereby the general shape of said transport arm element means is different from a straight line;

control means to control the movement of said tool supporting members and the movement of said transport arm means;

said tool storing magazine, said tool change apparatus and said control means being united in a compact self-contained unit which can be located net to a workpiece machining apparatus.

14. A workpiece storing magazine incoroprating a workpiece-change apparatus adapted to remove a workpiece from the magazine and to transport the workpiece into a machining apparatus, and adapted to remove a workpiece from the machining apparatus and to transport the workpiece back to the workpiece storing magazine, respectively, said workpiece-change apparatus comprising:

a plurality of essentially disc-shaped workpiece supporting members rotatably and coaxially arranged with reference to a first axis of rotation, said workpiece supporting members being adapted to receive and support a plurality of workpieces along the periphery thereof;

a transport arm means which is pivotally mounted on a second axis of rotation and longitudinally displaceable along said second axis, said second axis of rotation being located a certain distance from said first axis of rotation;

said transport arm means being adjustable with reference to its length and including a gripping means mounted on its free end;

said transport arm means further including a turning knuckle, the axis thereof extending in an angle of 45° with reference to the length adjustment direction of said transport arm means, and a transport arm element means, one end thereof being connected to said turning knuckle and the other end thereof bearing said gripping means, whereby the general shape of said transport arm element means is different from a straight line;

control means to control the movement of said workpiece supporting members and the movement of said transport arm means;

said workpiece storing magazine, said workpiece change apparatus and said control means being united in a compact self-contained unit which can be located next to a workpiece machining apparatus.

15. Use of the tool storing magazine incorporating a tool-change apparatus according to claim 1 for inserting and removing electrodes of and electro-erosive machining apparatus, the central axis of the inserted electrodes running in vertical or horizontal direction.

16. Use of the workpiece storing magazine incorporating a workpiece-change apparatus according to claim 7 for feeding workpieces to and removing workpieces from, respectively, an electro-erosive machining apparatus, the central axis of the workpieces received in the apparatus running in vertical or horizontal direction.

* * * * *

UNITED STATES PATENT AND TRADEMARK OFFICE
CERTIFICATE OF CORRECTION

PATENT NO. : 4,845,835

DATED : July 11, 1989

INVENTOR(S) : Rudolf Schneider

It is certified that error appears in the above-identified patent and that said Letters Patent is hereby corrected as shown below:

Column 7, Line 10, change "deing" to --being--.

Column 9, Line 6, change "net" to --next--.

Signed and Sealed this

Twelfth Day of June, 1990

Attest:

HARRY F. MANBECK, JR.

*Attesting Officer*  *Commissioner of Patents and Trademarks*